US011728888B2

(12) United States Patent
Arikawa et al.

(10) Patent No.: US 11,728,888 B2
(45) Date of Patent: Aug. 15, 2023

(54) RECEPTION DEVICE FOR OPTICAL SPACE COMMUNICATION, OPTICAL SPACE COMMUNICATION SYSTEM, AND METHOD FOR CONTROLLING OPTICAL SPACE COMMUNICATION DEVICE

(71) Applicant: NEC Corporation, Tokyo (JP)

(72) Inventors: Manabu Arikawa, Tokyo (JP); Toshiharu Ito, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/431,504

(22) PCT Filed: Feb. 19, 2020

(86) PCT No.: PCT/JP2020/006568
§ 371 (c)(1),
(2) Date: Aug. 17, 2021

(87) PCT Pub. No.: WO2020/189163
PCT Pub. Date: Sep. 24, 2020

(65) Prior Publication Data
US 2022/0149940 A1 May 12, 2022

(30) Foreign Application Priority Data
Mar. 20, 2019 (JP) .................. 2019-053717

(51) Int. Cl.
*H04B 10/11* (2013.01)
(52) U.S. Cl.
CPC .................. *H04B 10/11* (2013.01)
(58) Field of Classification Search
CPC .... H04B 10/11; H04B 10/075; H04B 10/118; H04B 10/2581; H04B 10/616; H04J 14/04
(Continued)

(56) References Cited

U.S. PATENT DOCUMENTS 10,122,447 B2* 11/2018 Takahashi .............. H04B 10/60
10,256,904 B2* 4/2019 Takahashi .............. H04B 10/60
(Continued)

FOREIGN PATENT DOCUMENTS

JP 2002-314487 A 10/2002
JP 2018-142873 A 9/2018
(Continued)

OTHER PUBLICATIONS

International Search Report for PCT Application No. PCT/JP2020/006568, dated May 12, 2020.
(Continued)

*Primary Examiner* — Abbas H Alagheband
(74) *Attorney, Agent, or Firm* — Sughrue Mion, PLLC

(57) ABSTRACT

Tracking control of a light beam is achieved at high speed and with good precision, without requiring preparation of an optical system that causes high signal loss when coupling a reception light beam with an optical fiber. A reception device for optical space communication comprises: fibers having a plurality of propagation modes with spatially different characteristics; an optical coupling system for coupling the reception light beam to the fibers; and a mode separator that separates the coupled light into a plurality of propagation modes, the adjustment axes of the optical coupling system for coupling the reception light beam to one end of the fibers being controlled on the basis of the total coupling strength to all of the modes, and the priority of control of the axes being adjusted on the basis of information about the coupling strength ratio for each mode.

5 Claims, 10 Drawing Sheets

(58) Field of Classification Search
USPC .......................................................... 398/118
See application file for complete search history.

(56) References Cited

U.S. PATENT DOCUMENTS

| | | | | |
|---|---|---|---|---|
| 10,313,011 | B2* | 6/2019 | Takahashi | H04B 10/548 |
| 10,411,802 | B2* | 9/2019 | Tanaka | H04B 10/112 |
| 2017/0070289 | A1* | 3/2017 | Takahashi | H04B 10/60 |
| 2017/0207850 | A1* | 7/2017 | Takahashi | H04B 10/60 |
| 2017/0264365 | A1* | 9/2017 | Takahashi | H04B 10/548 |
| 2017/0353241 | A1* | 12/2017 | Fazal | H04B 10/2581 |
| 2018/0041279 | A1* | 2/2018 | Segura | H04B 10/118 |

FOREIGN PATENT DOCUMENTS

| | | |
|---|---|---|
| WO | 2016/088318 A1 | 6/2016 |
| WO | 2017/141854 A1 | 8/2017 |

OTHER PUBLICATIONS

English translation of Written opinion for PCT Application No. PCT/JP2020/006568, dated May 12, 2020.
Hosokawa Kohei et al., "Free-space Optical Receiver using SDM Technique to Overcome Atmosphere Turbulence", 59th Space Science and Technology Union Lecture, 1H16, JSASS-2015-4126, Oct. 7-9, 2015, pp. 1-5.
Arimoto Yoshinori, "Transmission Characteristics of Multi-Gigabit Free-Space Optical Communication Terminal under Daylight Atmospheric Turbulences", The transactions of the Institute of Electronics, Information and Communication Engineers B, Mar. 1, 2013, vol. J96-B, No. 3, pp. 330-338.

\* cited by examiner

RECEPTION DEVICE FOR OPTICAL SPACE COMMUNICATION, OPTICAL SPACE COMMUNICATION SYSTEM, AND METHOD FOR CONTROLLING OPTICAL SPACE COMMUNICATION DEVICE

This application is a National Stage Entry of PCT/JP2020/006568 filed on Feb. 19, 2020, which claims priority from Japanese Patent Application 2019-053717 filed on Mar. 20, 2019, the contents of all of which are incorporated herein by reference, in their entirety.

TECHNICAL FIELD

The present invention relates to a free-space optical communication reception device, a free-space optical communication system, and a method for controlling a free-space optical communication device, and particularly to diversity reception in a plurality of modes having different spatial characteristics.

BACKGROUND ART

In recent years, there have been expectations for attempts to use an artificial satellite for performing remote sensing over a wide terrestrial area, providing communication to an environment in which a terrestrial communication network is not provided, and the like, and importance of a large-capacity communication link for connecting an artificial satellite and a terrestrial area has been increased accordingly. In microwave communication that has been used to date, legal and physical restrictions on band utilization are large, and the microwave communication is limited in ability to accommodate this capacity increase. Therefore, free-space optical communication is attracting attention as a method capable of achieving a large capacity with virtually no band restriction. Further, in the free-space optical communication, since light having a wavelength extremely shorter than that of microwaves is used, high directivity can be acquired, and miniaturization and weight reduction of a transmitter-receiver device, reduction in possibility of eavesdropping, and mitigation of interference at a time of simultaneous operation of a plurality of systems can be expected.

Transmittance of the atmosphere differs depending on a wavelength, and there are several optical wavelength bands in which the transmittance increases, and one of the optical wavelength bands is a wavelength band of 1.5 µm, which is commonly used in optical fiber communication. In free-space optical communication using the wavelength band of 1.5 µm, it is also an advantage that a transmission/reception technology and a device being developed for a single mode fiber (SMF) communication application can be used for achieving high speed and high-sensitivity optical communication. Meanwhile, in the free-space optical communication using such an SMF-based device, it is necessary to couple, on a receiving side, an optical signal transmitted from an artificial satellite or the like and propagated through the atmosphere to the SMF. However, in a general SMF, a core diameter thereof is as small as about 10 µm, and a wavefront of a beam propagated through the atmosphere is disturbed by an atmospheric fluctuation, and spatial coherence is limited, thereby coupling efficiency to the SMF is largely fluctuated and degraded, that is, so-called fading occurs as a problem.

One powerful approach to eliminate the fading caused by atmospheric fluctuation is use of a diversity reception scheme with a plurality of receivers. Assuming that a received effect of the atmospheric fluctuation is independent for each optical signal being input to each of the receivers, a probability of fading of a combined signal is reduced by selecting a best one of the plurality of receivers, or more generally by combining a plurality of received signals. Non Patent Literature 1 (NPL1) discloses a configuration of a reception device for mode-diversity type free-space optical communication, in which an optical beam is focused on a few-mode fiber having a plurality of propagation modes, and diversity combining is performed by digital signal processing.

FIG. 1 is a schematic diagram of a free-space optical communication system employing such mode diversity reception. The free-space optical communication system in FIG. 1 includes an optical transmission terminal 200 that transmits an optical signal into the atmosphere, and an optical reception terminal 100 that receives the transmitted optical signal propagating through the atmosphere. The optical transmission terminal 200 includes an optical transmitter 201 that generates an optical signal, a directivity control unit 203, an optical lens 202, and the like. The optical reception terminal 100 includes optical lenses 101 and 104, a coupling control unit 102, a beam splitter 103, a few-mode fiber 105, a mode separator 106, and coherent receivers 107a to 107c. The optical reception terminal 100 further includes analog-to-digital converters 108a to 108c (ADCs 108a to 108c), a digital signal processing unit 109, local oscillation light 110 (LO 110), an optical position detector 111, and a controller 112.

In the free-space optical communication system in FIG. 1, the optical transmission terminal 200 is mounted on, for example, an artificial satellite, and transmits an optical signal generated by the SMF-based optical transmitter 201 toward the optical reception terminal 100 via the directivity control unit 203. In the optical reception terminal 100, a received optical beam is coupled to the few-mode fiber 105 via the coupling control unit 102 and the like. Light coupled to the few-mode fiber 105 is received by an SMF-based receiver after components coupled into a plurality of propagation modes of the few-mode fiber 105 are each separated by the mode separator 106 and guided to the SMF. The free-space optical communication system in FIG. 1 employs the coherent receivers 107a to 107c as SMF-based receivers. Coherently received signals are sampled by the analog-to-digital converter 108a (ADCs 108a to 108c) and combined by the digital signal processing unit 109.

Since an effect of the atmospheric fluctuation received by the optical signal coupled to each mode can be regarded as varying independently or complementarily for each mode, an effect of fading on the combined signal is mitigated by a diversity effect.

In satellite-to-ground free-space optical communication, an optical beam is propagated over a long distance of several hundred kilometers or more for a low-orbit satellite and approximately 36,000 kilometers for a geostationary orbit satellite. Free-space optical communication using an optical-fiber-based receiver requires a very precise optical system, since it is required that the optical beam is ultimately guided to a core of an optical fiber, which is approximately 10 µm. Since a relative position between the artificial satellite and the ground changes by movement of the satellite, and an optical axis of the optical beam also fluctuates minutely by vibration, in order to remove these effects, it is necessary to perform dynamic tracking control at high speed and with high accuracy on a coupling optical system such as a mirror, as described in Non Patent Literature 2 (NPL2).

In the free-space optical communication system in FIG. 1, in order to control a coupling optical system, it is described that a part of the optical beam received by the optical reception terminal 100 is branched by the beam splitter 103 and position detection is performed on the branched optical beam by the optical position detector 111. As the optical position detector 111, a charge coupled device (CCD) camera, a four-quadrant photodetector, or the like is used, and a deviation of the optical beam from an optimum position for fiber coupling is detected. In a case of using a four-quadrant photodetector, as illustrated in FIG. 2, an intensity of light incident on four regions Q1 to Q4 of an XY plane is detected, and an amount of positional deviation is calculated based on the detected intensity. The coupling optical system is driven in such a way as to reduce the amount of positional deviation, based on a signal of the positional deviation of the optical beam detected in this way. Specifically, the controller 112 controls the coupling control unit 102 in such a way as to reduce the positional deviation amount, based on the signal of the positional deviation of the optical beam.

In this case, the light branched by the beam splitter 103 in order to control the coupling optical system is, as for a main signal to be coupled to the few-mode fiber 105 and received, a non-negligible loss as it is.

NPL2 describes a method of controlling a coupling optical system by using beacon light having different wavelengths. In this case, it is possible to perform control without loss of a main signal in principle by branching only the wavelengths of the beacon light, but in addition to a mechanism for aligning the beacon light and the main signal on the same axis with high accuracy on a transmission side, a device such as a dichroic mirror for separating light according to a wavelength on a reception side is necessary. In addition, a spatial profile of a light intensity of an optical beam of which wavefront has been distorted by atmospheric fluctuation changes according to a distance that the optical beam propagates in a free space. Specifically, in order to cause a positional deviation of the optical beam being detected by an optical position detector to coincide with a positional deviation at an input-end face of an optical fiber, it is necessary to design a strict propagation path for an optical beam after branching, even when a wavelength is the same.

CITATION LIST

Patent Literature

[PTL1] International Publication WO2017/141854
[PTL2] International Publication WO2016/088318

Non-Patent Literature

[NPL1] Hosokawa et al., "Free-space Optical Receiver using SDM Technique to Overcome Atmosphere Turbulence", 59th Space Science and Technology Union Lecture, 1H16 (2015)
[NPL2] Arimoto, "Transmission Characteristics of Multi-Gigabit Free-Space Optical Communication Terminal under Daylight Atmospheric Turbulences", The transactions of the Institute of Electronics, Information and Communication Engineers B, Vol. J96-B, No. 3, pp. 330-338 (2013)

SUMMARY OF INVENTION

Technical Problem

In a free-space optical communication system represented by satellite-to-ground free-space optical communication or the like, precise tracking control of a coupling optical system is required in order to couple a received optical beam to an optical fiber. In order to achieve precise tracking control of the coupling optical system, it is necessary to prepare an optical system for detecting a position of an optical beam for tracking, which causes a loss of a main signal and an increase in a cost of a receiver.

Patent Literature 1 (PTL1) relates to a free-space optical communication system, and proposes coupling a received optical beam to a few-mode fiber, separating light coupled to a plurality of propagation modes, and performing diversity combining of signals received in each of the propagation modes. PTL1 proposes controlling a coupling optical system, based on a coupling intensity to each of the propagation modes.

Patent Literature 2 (PTL2) relates to a spatial optical reception device, and proposes performing, by digital signal processing, diversity combining of signals received in each mode. PTL2 proposes an outline of control in which an optical system is controlled with reference to quality information of a signal to be acquired in a signal processing process of digital signal processing, and degradation of a signal-to-noise ratio (S/N ratio) of an optical signal is avoided by controlling the optical system in this way.

However, PTL1 and PTL2 propose an outline of the control, and do not clearly describe specific means or methods thereof.

An object of the present invention is to provide a free-space optical communication reception device, a free-space optical communication system, and a method for controlling a free-space optical communication device that achieve tracking control of an optical beam at high speed and with high accuracy, without preparing an optical system that causes a large signal loss when coupling a received optical beam to an optical fiber in a reception device to which mode diversity reception is applied.

Solution to Problems

In order to achieve the above-described object, a free-space optical communication reception device according to the present invention includes a fiber having a plurality of propagation modes having spatially different characteristics, a coupling optical system for coupling a received optical beam to the fiber, and a mode separator for separating light coupled to the plurality of propagation modes,
controls each adjustment axis of the coupling optical system for coupling the received optical beam to one end of the fiber, based on a sum of coupling intensities to all modes, and
adjusts a priority of the control, based on information of a coupling intensity ratio of each mode.

A free-space optical communication system includes the free-space optical communication reception device and a free-space optical communication transmission device that transmits signal light in a free space.

A method for controlling a free-space optical communication device is a method for controlling a free-space optical communication device including a fiber having a plurality of propagation modes having spatially different characteristics, a coupling optical system for coupling a received optical beam to the fiber, and a mode separator for separating light coupled to the plurality of propagation modes, and includes
controlling each adjustment axis of the coupling optical system for coupling the received optical beam to one end of the fiber, based on a sum of coupling intensities to all modes, and adjusting a priority of the control, based on information of a coupling intensity ratio of each mode.

Advantageous Effects of Invention

According to the present invention, in a reception device to which mode diversity reception is applied, it is possible to achieve tracking control of an optical beam at high speed and with high accuracy, without preparing an optical system that causes a large signal loss when a received optical beam is coupled to an optical fiber.

EXAMPLE EMBODIMENT

Before describing specific example embodiments of the present invention, an outline of the example embodiments of the present invention will be described. In the example embodiments of the present invention, a coupling optical system couples an optical beam to a few-mode fiber having a plurality of propagation modes. An optical signal coupled to each of the modes of the few-mode fiber is separated by a mode separator, and a light intensity of each optical signal is detected. In the example embodiments of the present invention, the coupling optical system is controlled in such a way as to maximize a sum of coupling intensities to all modes and brings an optical beam spot closer to a fiber center. Furthermore, information of a coupling intensity ratio for each mode being acquired thereby is used for adjusting a tracking control strategy of the coupling optical system.

In the example embodiments of the present invention, in a reception device to which mode diversity reception is applied, tracking control of an optical beam can be achieved without preparing an optical system that causes a large signal loss when a received optical beam is coupled to the optical fiber.

Figure 3:
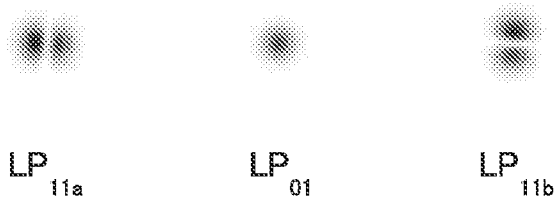
FIG. 3 is a diagram illustrating a spatial profile of an electric field in an LP mode.

This advantageous effect is explained by the following reasons. Each of the plurality of modes of the few-mode fiber has different spatial characteristics. For example, when separation using a general LP mode is performed, $LP_{01}$ mode has a unimodal intensity profile centered on an origin point, as illustrated in FIG. 3. Meanwhile, $LP_{11a}$ and $LP_{11b}$ modes each have two peaks in orthogonal axes, as illustrated in FIG. 3.

Figure 4:
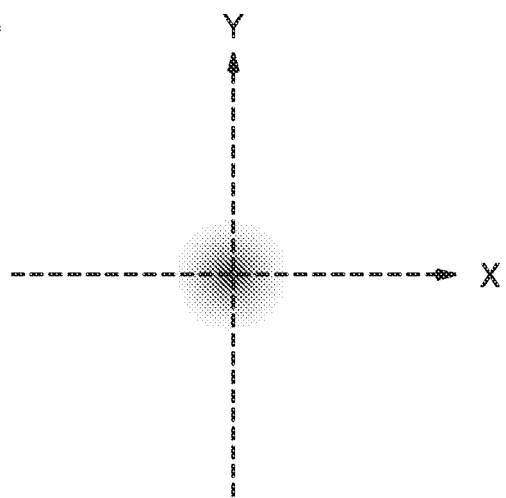
FIG. 4 is a diagram illustrating a spatial profile of a Gaussian beam whose center position coincides with an origin point.

It is considered that a Gaussian beam whose center position coincides with an origin point in an XY plane as illustrated in FIG. 4 to a few-mode fiber having those three modes is coupled. In this case, the optical beam is substantially coupled to the $LP_{01}$ mode and is hardly coupled to the $LP_{11a}$ mode or the $LP_{11b}$ mode.

Figure 5:
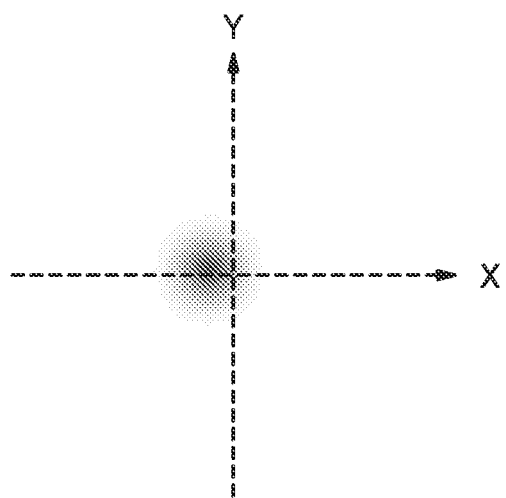
FIG. 5 is a diagram illustrating a spatial profile of a Gaussian beam whose center position deviates from an origin point.

In contrast, when it is considered that a Gaussian beam whose center position deviates from an origin point in an X-Y plane as illustrated in FIG. 5 is coupled, a coupling amount to the $LP_{01}$ mode decreases, and when a deviation amount is not so large, a coupling amount to the $LP_{11a}$ mode or the $LP_{11b}$ mode changes according to a deviation direction. In FIG. 5, since the deviation direction is an X-axis direction, the coupling amount to the $LP_{11a}$ mode increases and the coupling amount to the $LP_{11b}$ mode is not changed much or decreases. Therefore, information on an amount of positional deviation of the optical beam, although not perfect, can be acquired from information of a coupling intensity ratio for each mode. Example embodiments of the present invention use this for enabling adjustment of the tracking control strategy of the coupling optical system without providing an optical system that cause a large signal loss. Hereinafter, specific example embodiments of the present invention will be described.

First Example Embodiment

Figure 1:
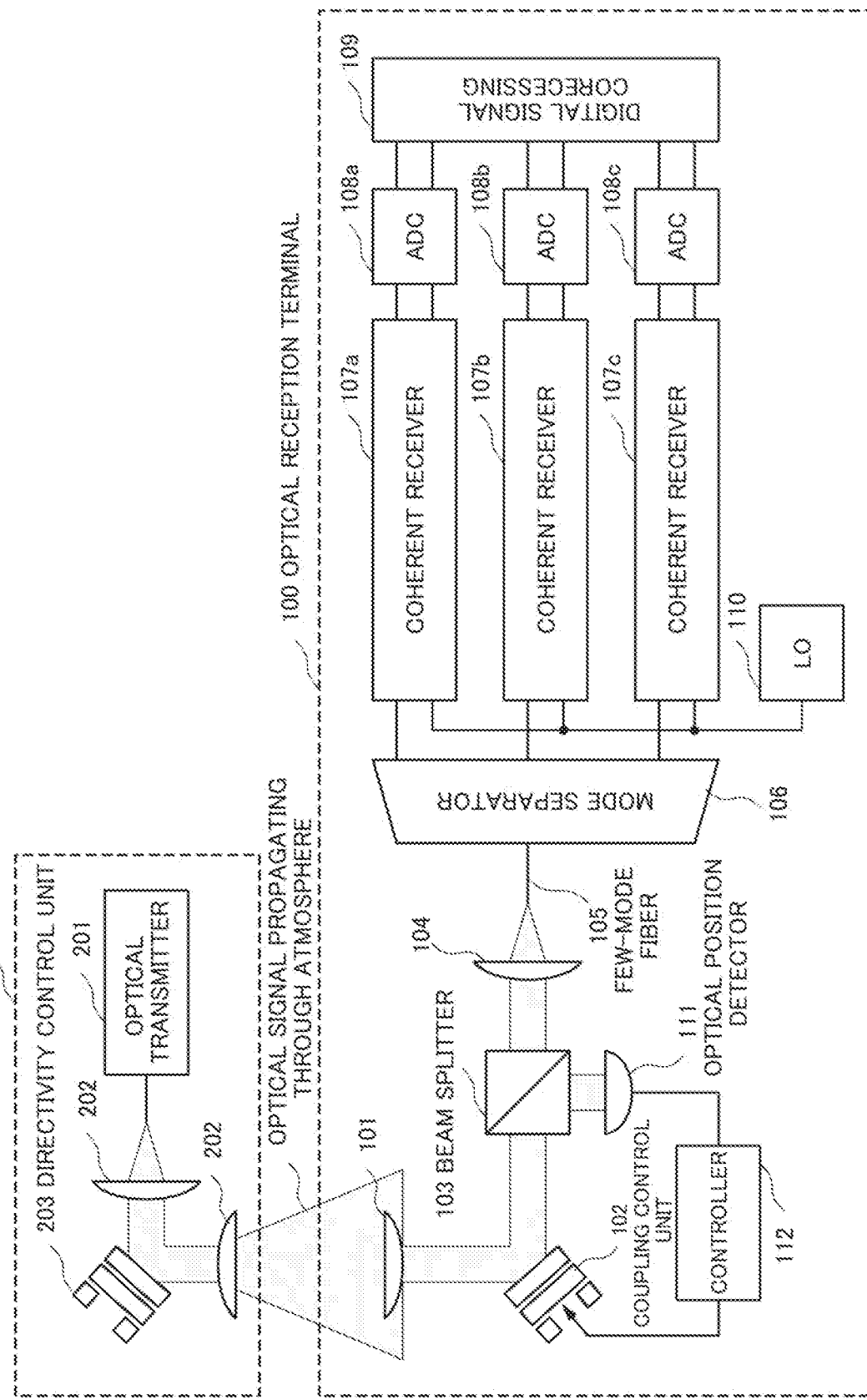
FIG. 1 is a block diagram for explaining a configuration example of a free-space optical communication system employing mode diversity reception.
Figure 2:
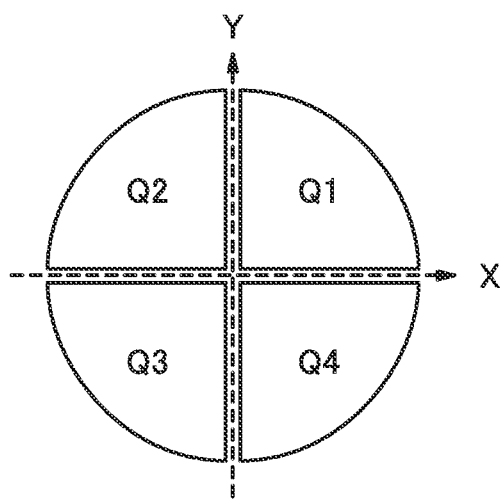
FIG. 2 is a diagram illustrating an image of detection of a positional deviation of an optical beam by a four-quadrant photodetector.
Figure 6:
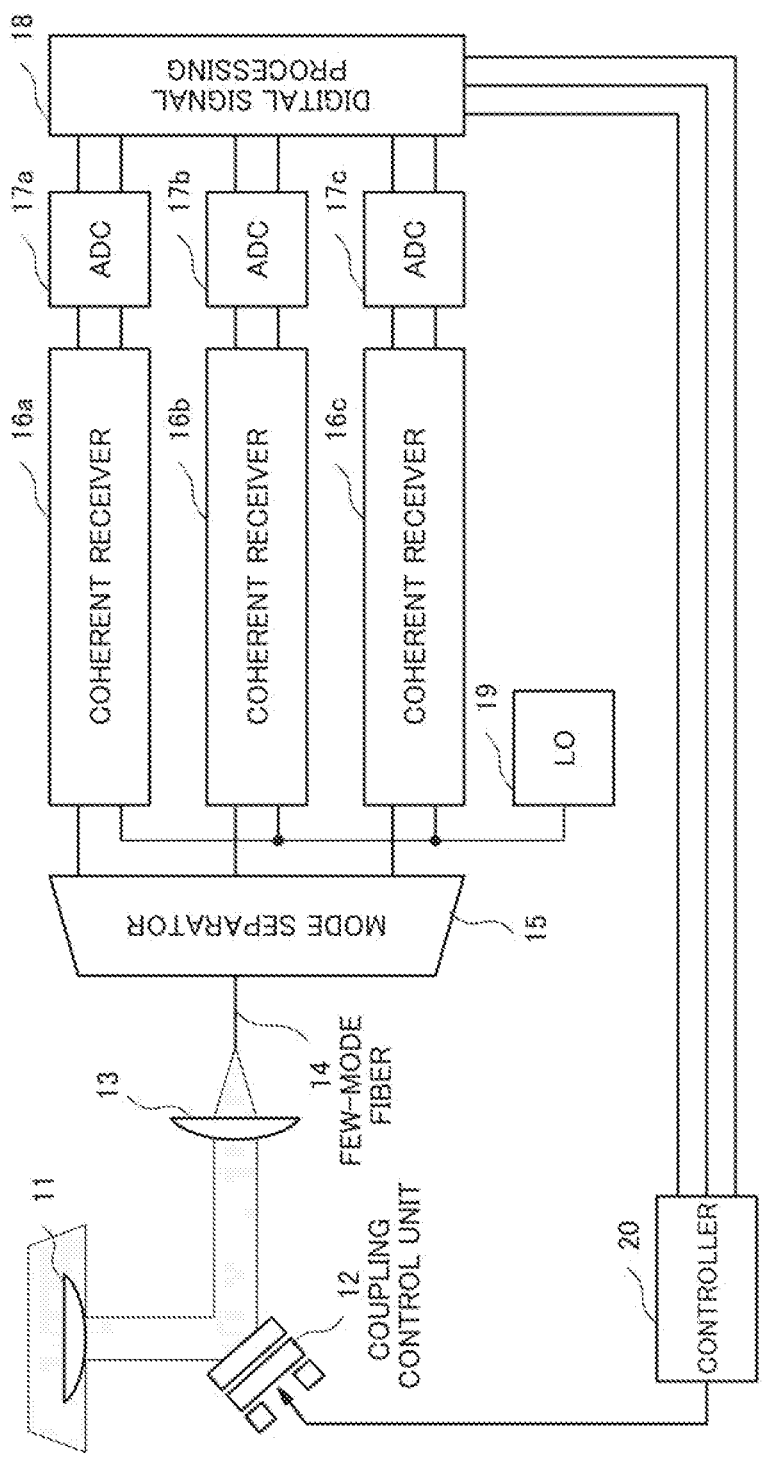
FIG. 6 is a diagram illustrating an example of a configuration of a free-space optical communication reception device to which mode diversity reception is applied, including reception optical system control according to the first example embodiment of the present invention.

First, a free-space optical communication reception device, a free-space optical communication system, and a method for controlling a free-space optical communication device according to a first example embodiment of the present invention will be described. FIG. 6 is a diagram illustrating an example of a configuration of a free-space optical communication reception device to which mode diversity reception is applied, including reception optical system control according to the first example embodiment of the present invention. The free-space optical communication system includes a transmission device such as an optical transmission terminal 200 in FIG. 1 for transmitting an optical signal into the atmosphere, and a reception device illustrated in FIG. 6 for receiving the transmitted optical signal propagating through the atmosphere.

The reception device in FIG. 6 includes a reception telescope 11, a coupling control unit 12, a coupling lens 13, a few-mode fiber 14, a mode separator 15, and an SMF-based receiver. In the reception device in FIG. 6, coherent receivers 16a to 16c are used as the SMF-based receivers. The reception device in FIG. 6 further includes analog-todigital converters 17a to 17c (ADCs 17a to 17c), a digital signal processing unit 18, a local oscillation light 19 (LO 19), and a controller 20.

An optical axis of an optical beam incident on the reception telescope 11 is controlled by the coupling control unit 12, and is coupled to the few-mode fiber 14 via the coupling lens 13. The coupling control unit 12 is constituted of a mirror whose tilt can be adjusted at high speed and with high accuracy. In this example, one mirror is used, and the optical axis of the optical beam is adjusted by controlling a tilt of the mirror in a horizontal direction (X-axis) and a vertical direction (Y-axis). More generally, by using two mirrors and adjusting tilts of the mirrors in X and Y-axes, the optical axis can be arbitrarily adjusted within a certain range. An optical signal coupled to the few-mode fiber 14 is separated for each mode by the mode separator 15 and guided to the coherent receivers 16a to 16c as the SMF-based receivers.

Herein, it is assumed that the mode separator 15 separates optical signals coupled to the three modes of the $LP_{01}$, the $LP_{11a}$, and the $LP_{11b}$, crosstalk between the modes in the few-mode fiber 14 and the mode separator 15 is negligibly small, and a insertion loss is small. Generally, coupling between modes during few-mode fiber propagation is not negligible, particularly between the degenerate $LP_{11a}$ and $LP_{11b}$ modes, but it has been reported that a few-mode fiber with an oval-shaped core can suppress coupling between modes during fiber propagation, including degenerate modes.

The optical signal for each mode is received by the coherent receivers 16a to 16c as the SMF-based receivers, each sampled by the ADCs 17a to 17c, and then combined by the digital signal processing unit 18. FIG. 6 illustrates a case of coherent reception and coherent combination in which maximum reception performance is theoretically acquired.

Herein, a case where a quadrature phase shift keying signal (QPSK signal) of single polarization is received will be described as an example. An optical amplifier may be placed between separation by the mode separator and reception by the receiver, and may amplify the signal. When the optical amplifier is not used, a main noise source of the reception device is shot noise, and when the optical amplifier is used, the main noise source is amplified spontaneous emission of the amplifier. In either case, it is desirable that the reception device and the optical amplifier used in each mode have as uniform a characteristic as possible in order to calculate a mode coupling ratio with high accuracy.

Figure 7:
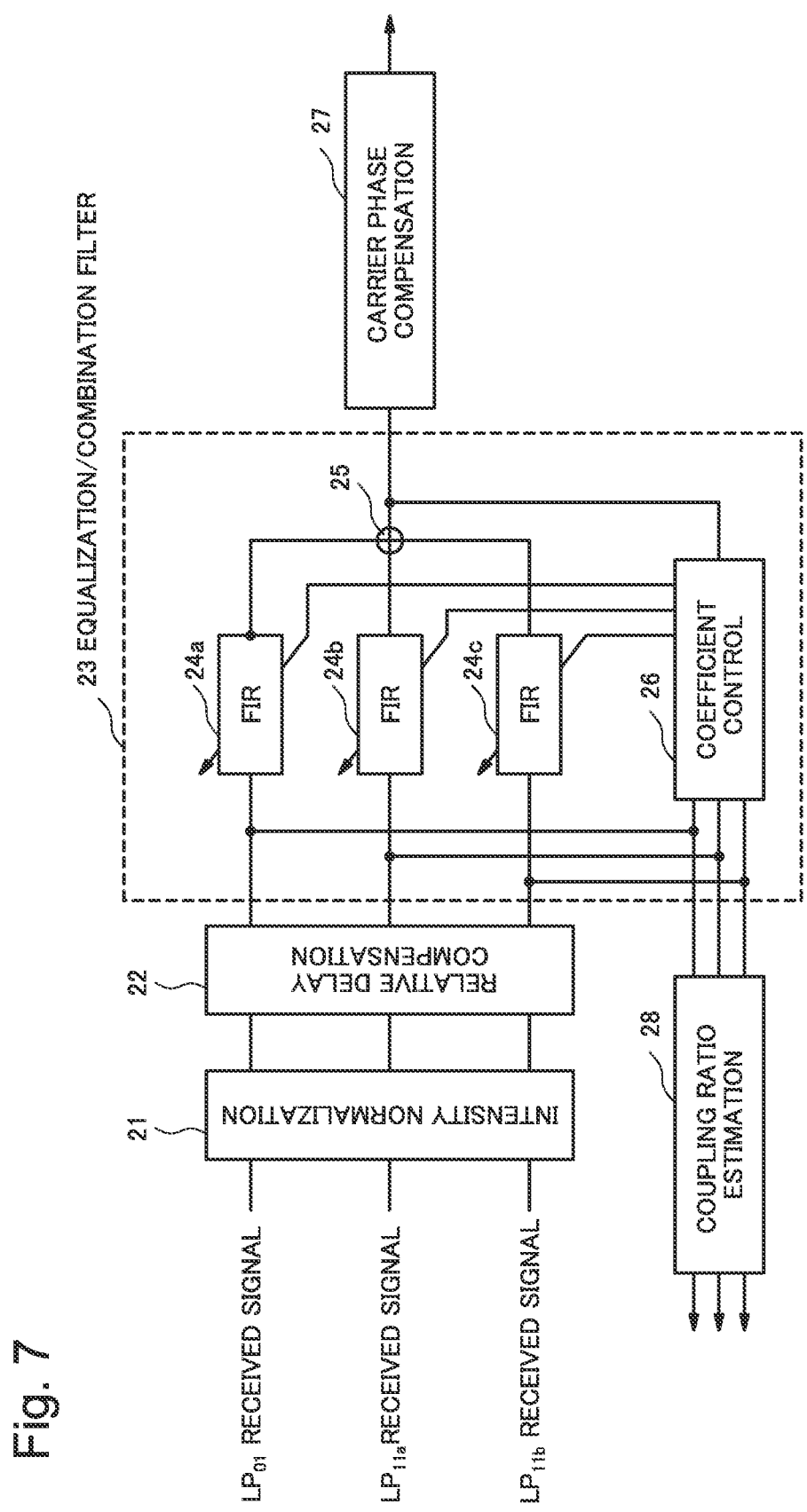
FIG. 7 is a block diagram illustrating a received digital signal processing unit including an information output for the reception optical system control in FIG. 6.

FIG. 7 is a block diagram illustrating a received digital signal processing unit including an information output for controlling the reception optical system in FIG. 6. The received digital signal processing unit in FIG. 7 includes an intensity normalization unit 21, a relative delay compensation unit 22, an equalization/combination filter 23, a carrier phase compensation unit 27, and a coupling ratio estimation unit 28. In the received digital signal processing unit in FIG. 7, received signals of the three modes of $LP_{01}$, $LP_{11a}$, and $LP_{11b}$ are first subjected to intensity normalization by the intensity normalization unit 21, and after relative delay compensation between the received signals is performed by the relative delay compensation unit 22, the received signals are input to the equalization/combination filter 23. The equalization/combination filter 23 performs equalization processing and diversity combining processing for removing inter-symbol interference caused by device incompleteness or the like of the reception device. The equalization/combination filter 23 in FIG. 7 includes finite impulse response (FIR) filters 24a to 24c, an adder 25, and a coefficient control unit 26. The equalization/combination filter 23 in FIG. 7 is an example of a case of being configured in such a way that the FIR filter is applied to each of the received signals and the outputs are added, and performing equalization and combination simultaneously by an adaptive equalization method in which an FIR filter coefficient is controlled based on a combined signal. As a coefficient control method, a constant modulus algorithm (CMA) or a decision-directed least mean square (DDLMS) algorithm can be applied. The received signal subjected to diversity combining by the equalization/combination filter 23 is subjected to carrier phase compensation by the carrier phase compensation unit 27, and is finally demodulated and decoded. Herein, coefficients of the FIR filters 24a to 24c are also input to the coupling ratio estimation unit 28 at the same time, and a mode coupling ratio is calculated.

In the case of FIG. 7, although intensity normalization is performed on the individual received signals and therefore a mode coupling ratio cannot be acquired by a simple intensity calculation, there is a one-to-one relationship between a coupling intensity to a certain mode and a signal-to-noise ratio (SNR) of a received signal of the mode, and the relationship is a proportional under an appropriate condition. Therefore, the mode coupling ratio can be calculated by estimating an SNR of the received signal. For SNR estimation, a method using second and fourth moments is known.

Figure 8:
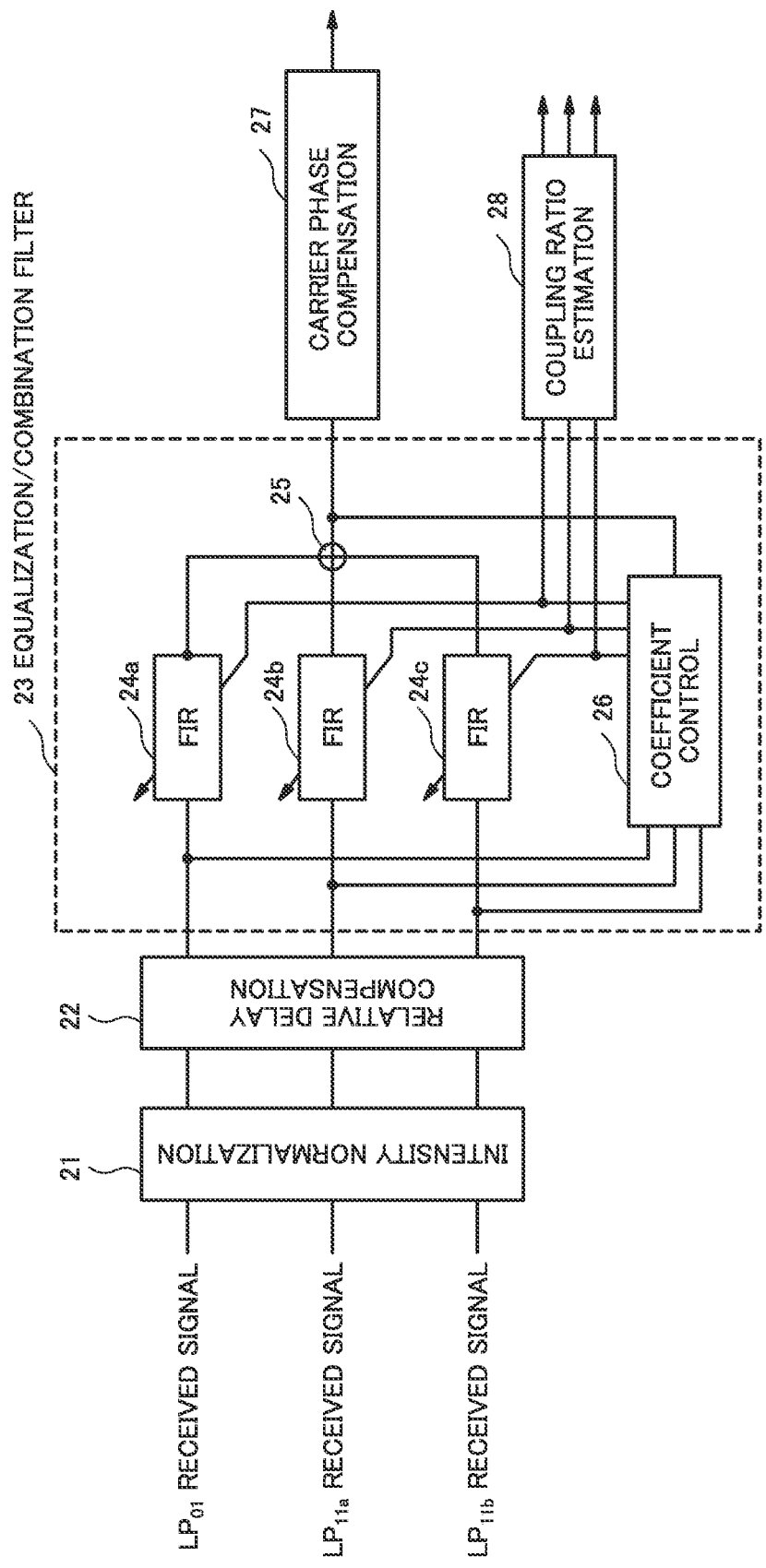
FIG. 8 is a block diagram illustrating a received digital signal processing unit in a case of extracting information of a mode coupling ratio from an FIR filter coefficient resulting from an adaptive control.

Alternatively, as illustrated in FIG. 8, the mode coupling ratio can be acquired from an FIR filter coefficient resulting from an adaptive control. FIG. 8 is a block diagram illustrating a received digital signal processing unit that is a modification example of the received digital signal processing unit in FIG. 7, in a case where information of the mode coupling ratio is extracted from an FIR filter coefficient resulting from an adaptive control. In FIG. 8, instead of the received signals of the three modes, coefficients of the FIR filters applied to the received signals are input to the coupling ratio estimation unit 28. A magnitude of the FIR filter coefficient after adaptive control convergence is a diversity combining coefficient, which has a one-to-one relationship with an SNR of each received signal. For an intensity-normalized signal, a combining weight that maximizes a combined SNR is $$\sqrt{SNR*(1+SNR)}$$

Since a magnitude of the FIR filter coefficient after the adaptive equalization convergence is regarded as an optimum weight thereof, an SNR and eventually a coupling intensity can be estimated from the magnitude. When the FIR filter coefficient has a temporal expanse due to removal of inter-symbol interference or the like, accuracy of the estimation is reduced, but it is also possible that one-tap combining weight coefficients are arranged in cascading way after the FIR filter, and thereby the FIR filter coefficient is detected.

Information of the mode coupling ratio thus acquired is input to the controller, and the coupling control unit is controlled.

Figure 9:
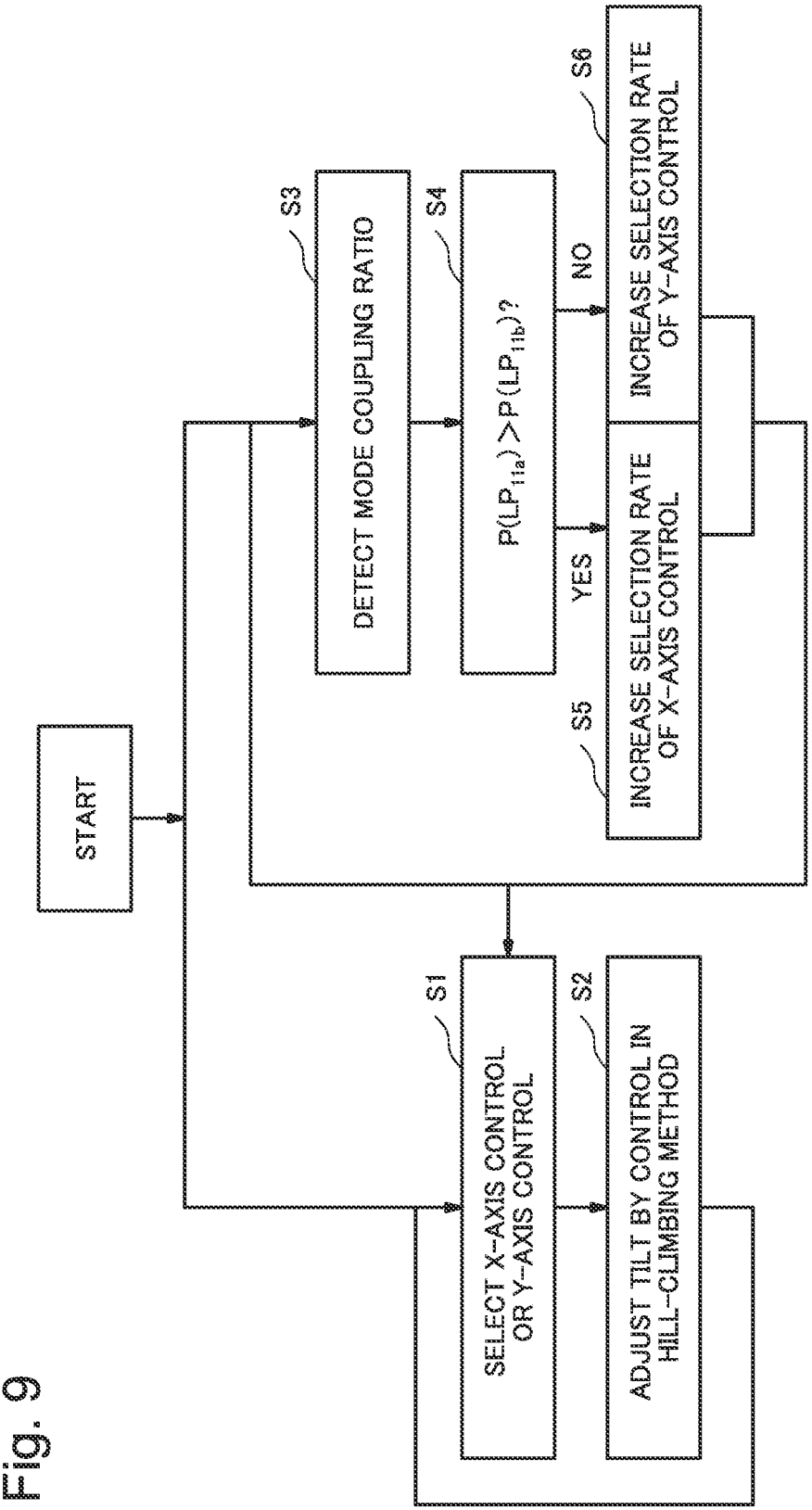
FIG. 9 is a flowchart for explaining a sequence of controlling a tilt of a mirror of a coupling optical system by a hill-climbing method using information of a mode coupling ratio.

FIG. 9 illustrates an example of a sequence in which control is performed by a hill-climbing method by using the information of the mode coupling ratio. In the hill-climbing method, tilts of an X-axis and a Y-axis of a mirror of the coupling optical system are controlled in such a way that a sum of the coupling intensities to all modes is maximized. First, which axis is to be controlled is selected (S1). In order to adjust the tilt of the X-axis, an amount of tilt is slightly increased or decreased from a current state for detecting a change in a total coupling intensity, and a direction in which the total coupling intensity is increased is acquired. Then, the amount of tilt is slightly changed in the direction in which the total coupling intensity is increased. The tilt of the X-axis is adjusted by sequentially repeating this process (S2). The same applies to the tilt of the Y-axis, but the control of the X-axis and the control of the Y-axis are first alternately selected and repeated. By repeating these controls sufficiently faster than a speed at which positional deviation and the like of the optical beam change, the mirror is adjusted to an optimum tilt.

In the sequence, a mode coupling ratio is detected (S3) in parallel with the control by the hill-climbing method, and a coupling intensity P ($LP_{11a}$) to the $LP_{11a}$ mode is compared with a coupling intensity P ($LP_{11b}$) to the $LP_{11b}$ mode (S4). When the coupling intensity to the $LP_{11a}$ mode is greater, the optical beam is likely to be position-deviated in the X-axis direction. Therefore, in this case, a selection rate of the X-axis control is increased (S5), and a ratio of the control of the X-axis and the control of the Y-axis, which have been alternately repeated the same number of times for each, is changed in such a way as to increase the rate of the control of the X-axis. Conversely, when the coupling intensity to the $LP_{11b}$ mode is greater, the optical beam is likely to be position-deviated in the Y-axis direction. Therefore, in this case, a selection rate of the Y-axis control is increased (S6), and the ratio of the control of the X-axis and the control of the Y-axis, which have been alternately repeated the same number of times for each, is changed in such a way as to increase the rate of the control of the Y-axis. After a hill-climbing control loop on a left side of FIG. 9 is tried to some extent, the control returns to detection of the mode coupling ratio again, and the adjustment of the ratio of the X-axis control and the Y-axis control is repeated. This makes it possible to reduce the number of times the control is performed in the hill-climbing control loop before a state of tilt at which the total coupling intensity is maximum is achieved, and therefore the control is made faster.

(Advantageous Effects of Example Embodiment)

According to the present example embodiment, in a reception device to which mode diversity reception is applied, it is possible to achieve tracking control of an optical beam at high speed and with high accuracy, without preparing an optical system that causes a large signal loss when the received optical beam is coupled to the optical fiber.

In the present example embodiment, when an optical signal of single polarization is used and coupling between modes during propagation in a few-mode fiber is negligibly small, tracking control of an optical beam can be achieved at high speed and with high accuracy, without preparing an optical system that causes a large signal loss when coupling a received optical beam to an optical fiber.

Second Example Embodiment

Next, a free-space optical communication reception device, a free-space optical communication system, and a method for controlling a free-space optical communication device according to a second example embodiment of the present invention will be described.

In the first example embodiment of the present invention described above, it is assumed that a single polarization optical signal is used and coupling between modes during propagation in the few-mode fiber is negligibly small. In contrast, the second example embodiment of the present invention will be described, assuming that the present invention is applied to a case where a polarization multiplexing signal is used and coupling between modes during propagation in a few-mode fiber cannot be ignored. A configuration of the free-space optical communication reception device is the same as that in FIG. 6 except that a polarization diversity type coherent receiver is employed for the polarization multiplexing signal and an output thereof are four signals of in-phase (I) phase component, quadrature (Q) phase component, X polarization, and Y polarization, and three modes of $LP_{01}$, $LP_{11a}$, and $LP_{11b}$ are used.

Figure 10:
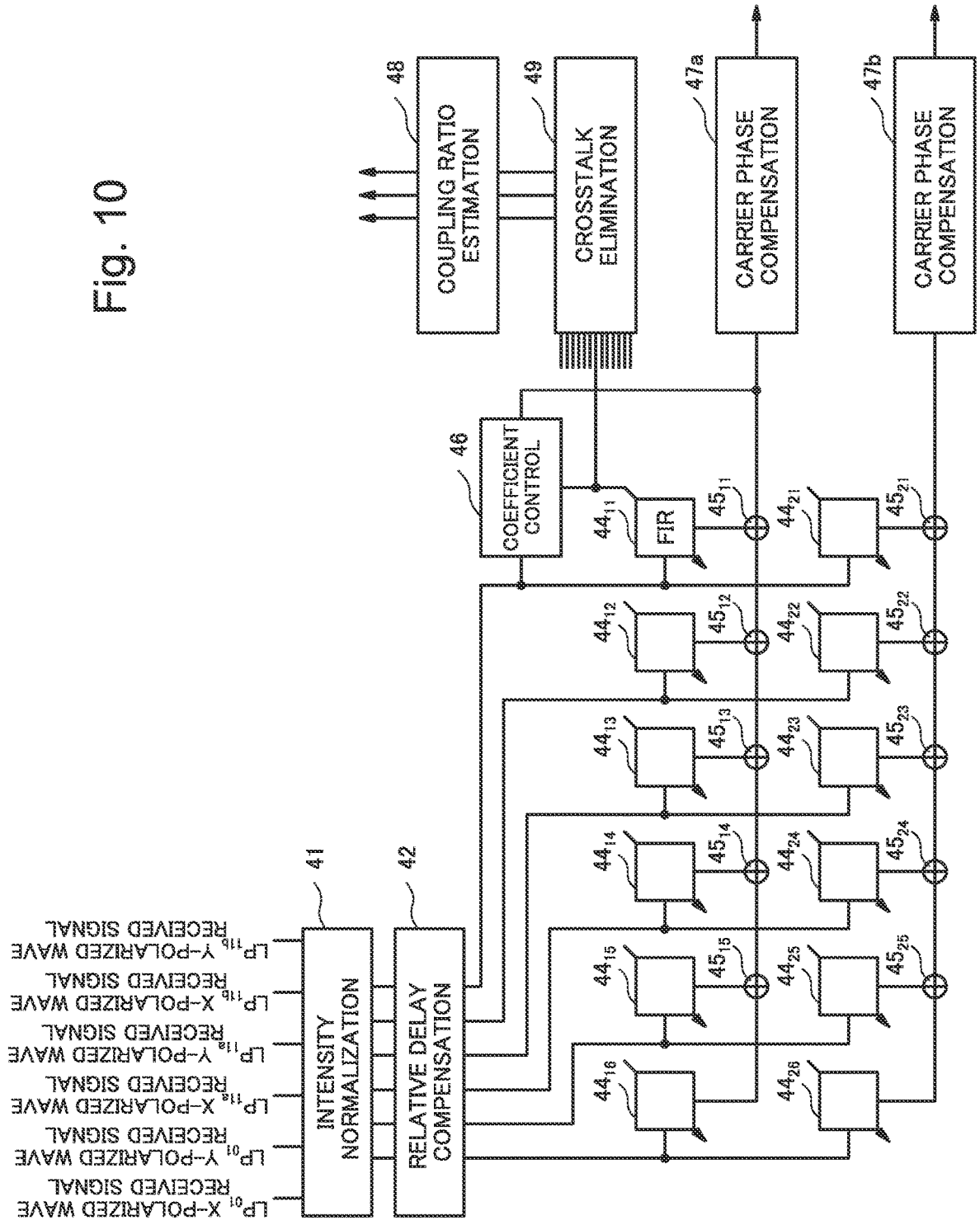
FIG. 10 is a block diagram illustrating a digital signal processing unit used in a free-space optical communication reception device according to a second example embodiment of the present invention.
Figure 11:
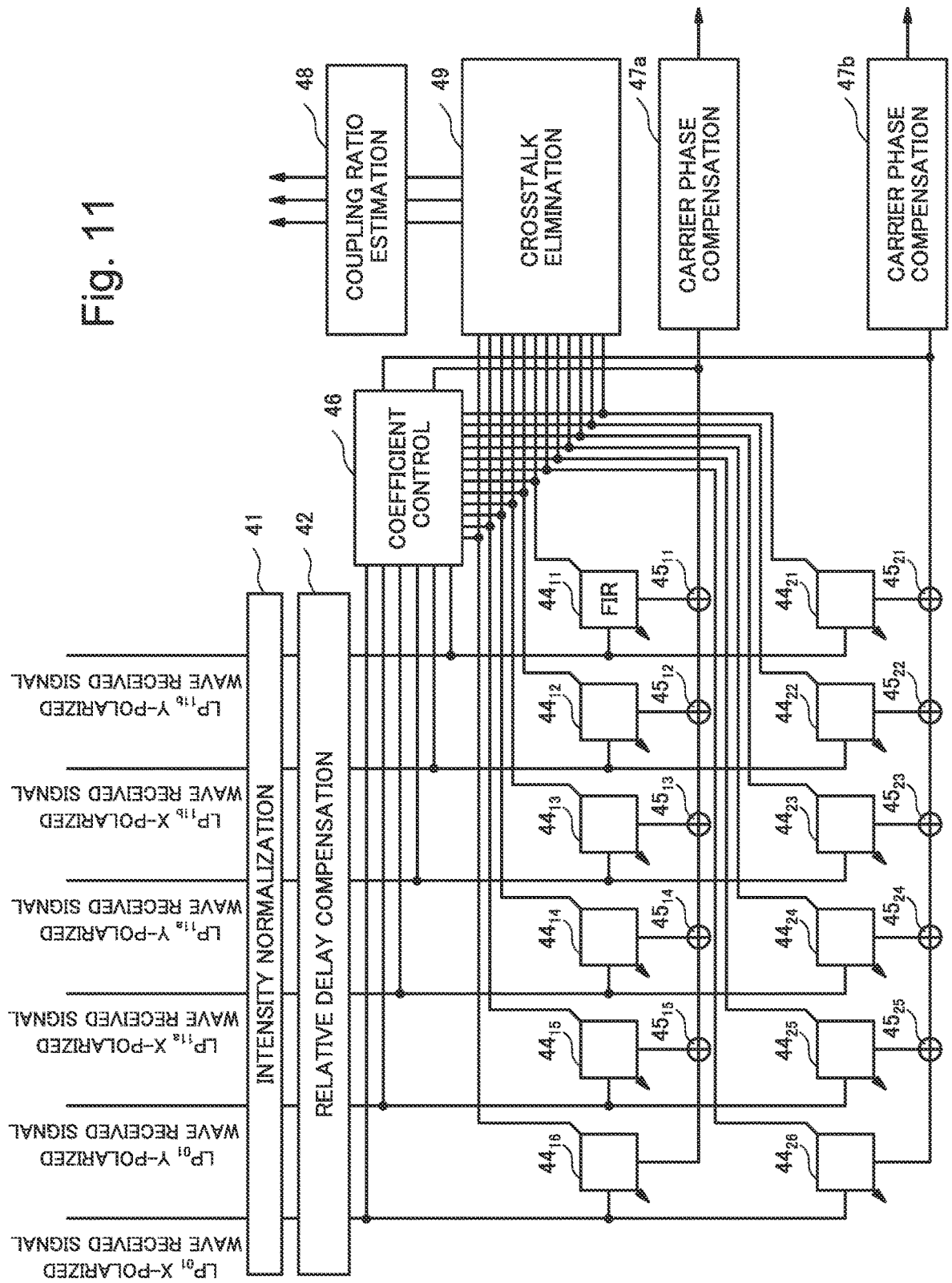
FIG. 11 is a block diagram illustrating connection of the digital signal processing unit in FIG. 10 in detail.

FIG. 10 is a block diagram illustrating a digital signal processing unit to be used in the free-space optical communication reception device according to the second example embodiment of the present invention. FIG. 11 is a block diagram illustrating detailed connection of the digital signal processing unit in FIG. 10. The digital signal processing unit in FIG. 10 includes an intensity normalization unit 41, a relative delay compensation unit 42, a FIR filter 44 (FIR filters $44_{11}$ to $44_{16}$ and $44_{21}$ to $44_{26}$), an adder 45 (adders $45_{11}$ to $45_{15}$ and $45_{21}$ to $45_{25}$), a coefficient control unit 46, carrier phase compensation units 47a and 47b, a crosstalk elimination unit 49, and a coupling ratio estimation unit 48.

Six received signals of X-polarized wave and Y-polarized wave in the three modes of $LP_{01}$, $LP_{11a}$, and $LP_{11b}$ are first subjected to intensity normalization in the intensity normalization unit 41, and after relative delay compensation between the received signals is performed in the relative delay compensation unit 42, the received signals are input to the FIR filters $44_{11}$ to $44_{16}$ and $44_{21}$ to $44_{26}$ for performing equalization, polarization isolation, and diversity combining, being arranged in a matrix form. Similarly to FIG. 7, coefficients of the FIR filters $44_{11}$ to $44_{16}$ and $44_{21}$ to $44_{26}$ are controlled by an adaptive equalization method, based on the combined signals. In FIG. 10, input/output relation of the coefficient control unit 46 is illustrated only for one FIR filter $44_{11}$ for readability. FIG. 11 illustrates the input/output relation of the coefficient control unit 46 for all the FIR filters $44_{11}$ to $44_{16}$ and $44_{21}$ to $44_{26}$. In the digital signal processing unit in FIG. 10, as illustrated in FIG. 8, a mode coupling ratio is estimated from coefficients of the FIR filters $44_{11}$ to $44_{16}$ and $44_{21}$ to $44_{26}$ being acquired as a result of adaptive control. However, in the present example embodiment, coupling between the polarized waves and coupling between the modes occur, and therefore, it is necessary to appropriately remove the couplings between the polarized waves and the modes. For this purpose, the digital signal processing unit according to the present example embodiment includes a crosstalk elimination unit 49. In the digital signal processing unit according to the present example embodiment, the coefficients of the FIR filters $44_{11}$ to $44_{16}$ and $44_{21}$ to $44_{26}$ are input to the crosstalk elimination unit 49, and after effects of the coupling between the polarized waves and the coupling between the modes are removed, the coupling ratio estimating unit 48 estimates a mode coupling ratio.

Since the coefficient of the FIR filter after adaptive equalization convergence is equivalent to an inverse function of a channel response, the coefficient is detected by using a training signal or the like being orthogonal between the modes. By using a coupling state between the polarized waves and a coupling state between the modes being associated with propagation in the few-mode fiber that are detected in this manner, the crosstalk elimination unit 49 removes an effect of the coupling between the polarized waves and the coupling between the modes. Thereafter, the coupling ratio estimation unit 48 estimates a mode coupling ratio.

(Advantageous Effects of Example Embodiment)

According to the present example embodiment, similarly to the first example embodiment, in a reception device to which mode diversity reception is applied, it is possible to achieve tracking control of an optical beam at high speed and with high accuracy, without preparing an optical system that causes a large signal loss when the received optical beam is coupled to an optical fiber.

In the present example embodiment, when the polarization multiplexing signal is used and coupling between the modes during propagation in the few-mode fiber is not negligible, tracking control of the optical beam can be achieved at high speed and with high accuracy, without preparing an optical system that causes a large signal loss when coupling the received optical beam to the optical fiber.

Third Example Embodiment

Figure 12:
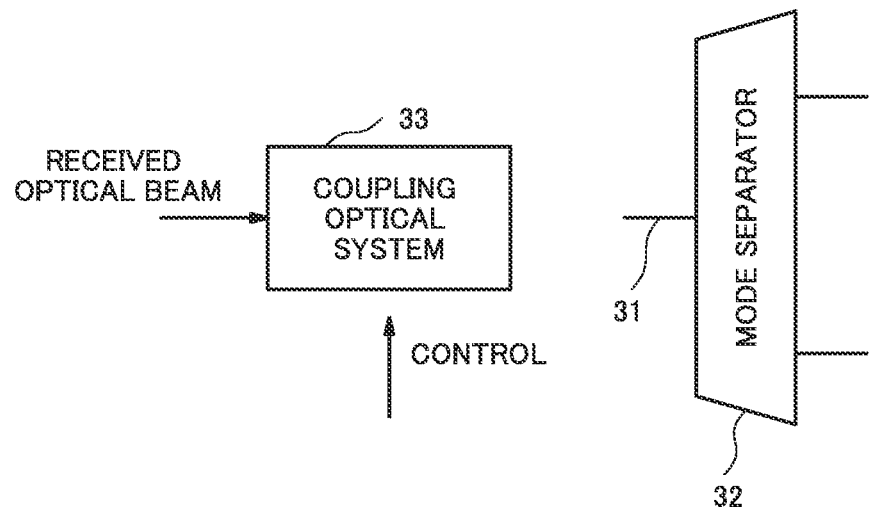
FIG. 12 is a configuration diagram illustrating a free-space optical communication reception device according to a third example embodiment of the present invention.

Next, a free-space optical communication reception device according to a third example embodiment of the present invention will be described. FIG. 12 is a configuration diagram illustrating a free-space optical communication reception device according to the third example embodiment of the present invention. The free-space optical communication reception device in FIG. 12 includes a fiber 31 having a plurality of propagation modes having spatially different characteristics, a coupling optical system 33 for coupling a received optical beam to the fiber 31, and a mode separator 32 for separating light coupled to the plurality of propagation modes. In the free-space optical communication reception device in FIG. 12, each adjustment axis of the coupling optical system 33 for coupling the received optical beam to one end of the fiber 31 is controlled based on a sum of coupling intensities to all modes. Then, in the free-space optical communication reception device in FIG. 12, a priority of the control is adjusted based on information of a coupling intensity ratio for each mode.

According to the present example embodiment, information on a positional deviation amount of the received optical beam is acquired from the information of the coupling intensity ratio for each mode. Use of this information makes it possible to adjust a tracking control strategy of the coupling optical system. Thus, in the reception device to which mode diversity reception is applied, it is possible to achieve tracking control of the optical beam at high speed and with high accuracy, without preparing an optical system that causes a large signal loss when the received optical beam is coupled to the fiber 31.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-53717, filed on Mar. 20, 2019, the disclosure of which is incorporated herein in its entirety by reference.

REFERENCE SIGNS LIST

11 Reception telescope
12 Coupling control unit
13 Coupling lens
14 Few-mode fiber
15 Mode separator
16a to 16c Coherent receiver
17a to 17c ADC
18 Digital signal processing unit
19 LO
20 Controller
21, 41 Intensity normalization unit
22, 42 Relative delay compensation unit
23 Equalization/combination filter
24a, 24b, 24c, $44_{11}$ to $44_{16}$, $44_{21}$ to $44_{26}$ FIR filter
25, $45_{11}$ to $45_{15}$, $45_{21}$ to $45_{25}$ Adder
26, 46 Coefficient control unit
27, 47a, 47b Carrier phase compensation unit
28, 48 Coupling ratio estimation unit
49 Crosstalk elimination unit

What is claimed is:

1. A free-space optical communication reception device comprising:
   a fiber having a plurality of propagation modes having spatially different characteristics;
   a coupling optical system for coupling a received optical beam to the fiber;
   a mode separator for separating light coupled to the plurality of propagation modes; and
   a digital signal processing unit that performs diversity combining of a signal received in each mode, wherein:
      each adjustment axis of the coupling optical system for coupling the received optical beam to one end of the fiber is controlled based on a sum of coupling intensities to all modes,
      a priority of control is adjusted based on information of a coupling intensity ratio for each mode,
      the digital signal processing unit calculates a signal-to-noise ratio of a received signal for each mode, and estimates a coupling intensity to each mode, based on the calculated signal-to-noise ratio,
      the digital signal processing unit includes an equalization/combination filter, and
      the coupling intensity to each mode is estimated from a magnitude of a coefficient of a finite impulse response (FIR) filter being applied to each mode in the equalization/combination filter.

2. The free-space optical communication reception device according to claim 1, further comprising a crosstalk elimination unit that removes an effect of coupling between modes during fiber propagation from the coefficient of the finite impulse response (FIR) filter, wherein:
   the coupling intensity to each mode is estimated from a coefficient after an effect of crosstalk is removed by the crosstalk elimination unit.

3. A free-space optical communication system comprising:
   the free-space optical communication reception device according to claim 1; and
   a free-space optical communication transmission device that transmits signal light into a free space.

4. A method for controlling a free-space optical communication device including:
   a fiber having a plurality of propagation modes having spatially different characteristics;
   a coupling optical system for coupling a received optical beam to the fiber; and
   a mode separator for separating light coupled to the plurality of propagation modes, the method comprising:

controlling each adjustment axis of the coupling optical system for coupling a received optical beam to one end of the fiber, based on a sum of coupling intensities to all modes; and adjusting a priority of control, based on information of a coupling intensity ratio for each mode, wherein:

the free-space optical communication device includes a digital signal processing unit that performs diversity combining of a signal received in each mode, the digital signal processing unit calculates a signal-to-noise ratio of a received signal for each mode, and estimates a coupling intensity to each mode, based on the calculated signal-to-noise ratio, and the digital signal processing unit includes an equalization/combination filter, and estimates the coupling intensity to each mode from a magnitude of a coefficient of a finite impulse response (FIR) filter being applied to each mode in the equalization/combination filter.

5. A method for controlling a free-space optical communication device including:

a fiber having a plurality of propagation modes having spatially different characteristics;

a coupling optical system for coupling a received optical beam to the fiber; and a mode separator for separating light coupled to the plurality of propagation modes, the method comprising:

controlling each adjustment axis of the coupling optical system for coupling a received optical beam to one end of the fiber, based on a sum of coupling intensities to all modes; and adjusting a priority of control, based on information of a coupling intensity ratio for each mode, wherein:

the free-space optical communication device includes a digital signal processing unit that performs diversity combining of a signal received in each mode, the digital signal processing unit calculates a signal-to-noise ratio of a received signal for each mode, and estimates a coupling intensity to each mode, based on the calculated signal-to-noise ratio, and the free-space optical communication device includes a crosstalk elimination unit that removes an effect of coupling between modes during fiber propagation from a coefficient of an FIR filter, and estimates the coupling intensity to each mode from a coefficient after an effect of crosstalk is removed by the crosstalk removing unit.

* * * * *